Jan. 6, 1948.  W. I. TAWES  2,434,183
OIL SEAL
Filed Jan. 27, 1945
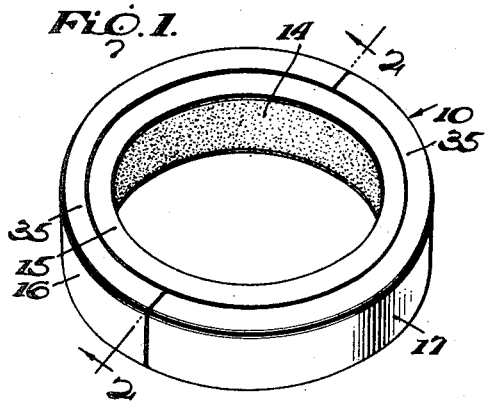
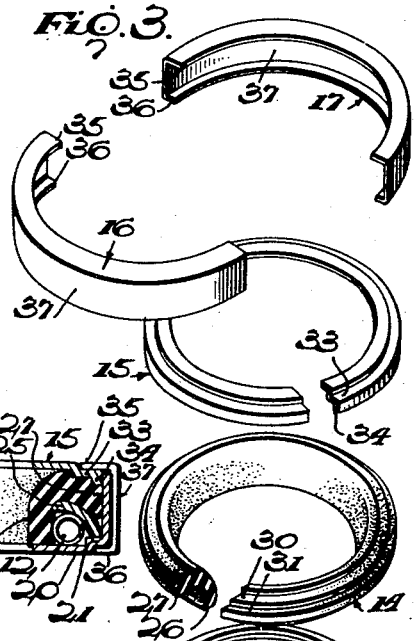
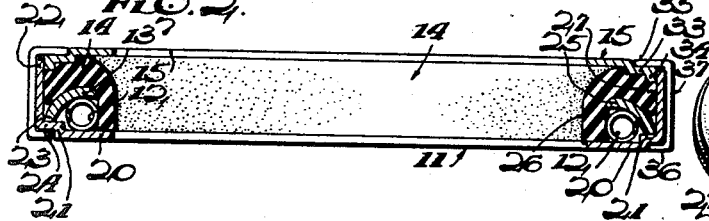
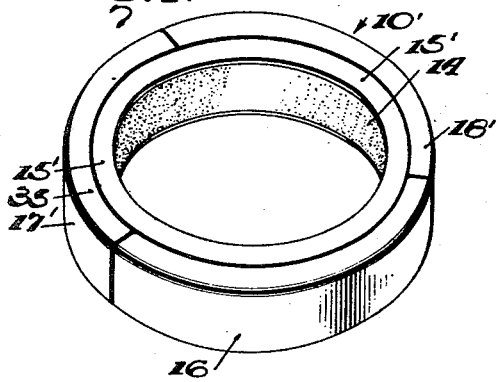
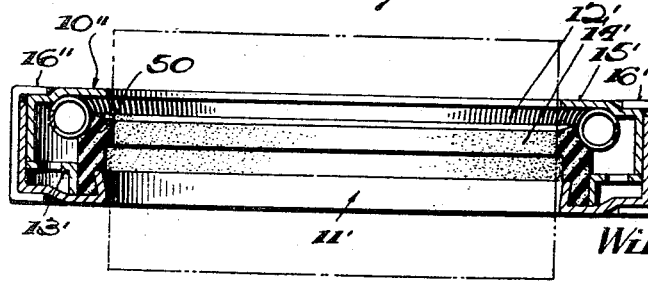
Inventor
William I. Tawes
By Albert T. St Clair
Attorney Patented Jan. 6, 1948

2,434,183

UNITED STATES PATENT OFFICE 2,434,183

OIL SEAL

William I. Tawes, Claymont, Del.

Application January 27, 1945, Serial No. 574,846

4 Claims. (Cl. 288—3)

1

This invention relates to the art of oil or grease seals, and more particularly to an oil or grease seal which is repairable.

Prior art oil and grease seals have been objectionable because there has been no practicable way of salvaging or cleaning them, and thereby restoring them to useful service when the washer member became worn out, or when the seal has ceased to function because of dirt and caked grease. Where it was possible to salvage them at all, it was necessary to unspin the outer casing to disassemble, and then to respin it back into sealing position after replacement of the damaged washer.

I have discovered that it is possible to make an efficient seal for oil or grease, or other liquids, which can easily be disassembled, repaired, and then reassembled without any mechanical changes in the component parts.

It is therefore an object of my invention to make a new and improved oil or grease seal.

It is another object to make an oil or grease seal which can quickly and easily be disassembled and reassembled.

It is a further object to make an oil or grease seal that is easily repaired or reconditioned.

With the above and other objects in view, which will be apparent as the description proceeds, I have set forth my invention in the following specification and have illustrated it in the accompanying drawings, in which:

Fig. 1 is a perspective view of my new and improved seal;

Fig. 2 is a transverse section on the line 2—2 of Fig. 1;

Fig. 3 is a telescopic view with the parts arranged in spaced relation in the order of assembly from the bottom up;

Fig. 4 is a perspective view of a modified form of seal; and

Fig. 5 is a transverse section through a still further modified form of my invention.

Referring to the accompanying drawings, and in particular to Figs. 1–3 thereof, the preferred embodiment of my improved oil or grease seal 10 comprises a retaining shell or bottom plate 11, a garter spring 12, a supporting ring or guard plate 13, a washer 14, a clamping ring or retaining plate 15, and a 2-segment retaining member 16, 17.

As shown, at the bottom of Fig. 3 and in Fig. 2, the retaining shell 11 is essentially a ring that is L-shaped in cross-section, but with a horizontal portion 20 having an upwardly offset portion 21 at its outer part, and with a vertical flange 22 constituting the other arm of the L.

The garter spring 12 is merely a coiled spring formed into a closed ring which normally rests upon the horizontal portion 20 of retaining shell 11, and has a proper diameter to provide a suitable pressure around the wiping edge of the washer 14, to prevent the leakage of grease, oil, or any other liquid used in this mechanism.

The supporting ring 13 conforms roughly to the upper outer quadrant of a hollow ring, and has a diameter such that its lower periphery 23 will rest in the angle 24 formed by the offset portion 21 and the vertical flange 22 of the retaining shell 11. The upper periphery 25 of ring 13 is of such a diameter that it will rest on the top of garter spring 12.

Washer 14 may be made of any suitable gasket material, such as leather or rubber, and preferably comprises an inner vertical flange 26, that constitutes a wiping edge around the shaft with which the washer is adapted to cooperate, and a substantially horizontal flange 27 extending outwardly therefrom, to provide a turned-over dam to prevent grease, oil, or other liquids, from leaking through between the shaft and the washer. Flange 26 is of such diameter that it will bear against the upper periphery 25 of the supporting ring 13. The horizontal flange 27 of washer 14 is provided with a series of steps 30, 31 for a purpose about to be described.

Clamping ring 15 is a flat ring which has a stepped-down flat outer portion 33 terminating in a downwardly projecting flange 34. The latter is just enough smaller in diameter than the internal diameter of vertical flange 22 of retaining shell 11 to rest thereagainst and to be received in the outer step 31 of washer 14. The stepped-down flat outer portion 33 of clamping ring 15 is likewise received in the inner step 30 of washer 14.

The two-segment retaining member 16, 17 comprises two mating, substantially U-shaped, spring segments 16 and 17, which together form a simple and effective closure for the assembled parts. Each segment 16, 17 has a main vertical portion 37 provided with inwardly extending horizontal flanges 35, 36. As best shown in Fig. 2, upper flange 35 is slightly wider than lower flange 36. When segments 16, 17 are in place, the upper flange 35 fits snugly over the stepped-down portion 33 of clamping ring 15, and the lower flange 36 fits over the upwardly offset portion 21 of retaining shell 11.

These seven parts are readily assembled by inserting the garter spring 12 in retaining shell 11 and placing the supporting ring 13 over garter spring 12. Washer 14 is then inserted inside supporting ring 13, and clamping ring 15 is placed in position on top of the washer 14. With the parts in this position, the retaining segments 16 and 17 are then easily pressed together around the previously assembled parts, and the oil or grease seal is ready for use.

As best shown in Fig. 4, the segments of my oil or grease seal 10' do not have to be limited to two, but there may be a greater number. In Fig. 4, I have shown three segments 16', 17', and 18', each of 120°. Where desired, there may be an even greater number of segments.

In Fig. 5, I have shown a further modified form of oil or grease seal 10'', which is composed of a retaining shell 11', a garter spring 12', a clamping ring 13', a washer 14', a cover ring 15', and a two-segment retaining member 16''. These parts, as shown, are of slightly different configuration than the corresponding parts in Figs. 1–3.

These parts are assembled in a slightly different order, in that the washer 14' is first inserted in the retaining shell 11' and clamping ring 13' is then pressed down around the washer, pinching its lower edge as shown. Garter spring 12' is next engaged with a recess 50 in the upper outer periphery of washer 14'. Cover ring 15' is then inserted inside the vertical flange of the retaining shell 11', resting on the clamping ring 13'. This completes the assembly, except for the two retaining segments 16'' (only one of which is shown), which are then sprung into place around the retaining shell 11' and the cover ring 15'.

As will be evident, most of these parts are made by ordinary stamping operations, and the entire device is simple and inexpensive.

The washer may be of any desired resilient material, such as leather, rubber, synthetic rubber, or fiber. The metal parts may be made of any suitable material, such as steel, aluminum, magnesium, or any suitable alloy.

From the above description, it will be apparent that when a washer 14 wears out, or is damaged for any other reason, it may easily be replaced, in a matter of a few seconds, by merely removing the retaining segments 16 and 17, lifting out the retaining plate 15 and the old washer 14, inserting a new washer 14, and replacing the retaining plate 15 and the retaining segments 16, 17.

This permits the immediate correction of a faulty oil or grease seal, without waiting or incurring the expense of securing a new one, and permits the conservation of metal, inasmuch as the metal parts are not damaged by normal wear and may be used over and over again.

When seals are used over a long period, they tend to collect dirt, grease, and other matter, which hardens and prevents the seal washer from having its normal resiliency. Under these conditions, the seal ceases to function effectively. With my construction, this may be easily remedied by disassembling the seal, cleaning the parts, and reassembling them. In many cases, this cleaning is all that is necessary to cause the seal to again function efficiently.

As I have indicated above, seals embodying the present invention are adapted to form an efficient seal for grease, oil, or other liquids. They are also useful in connection with any soft plastic material, like grease. Consequently, where I have used the term "oil seal" in my claims, I wish it to be understood that it means broadly a seal that is adapted for use with any liquid or soft plastic material.

They may be used not only around rotating shafts, but have a wide variety of other uses, such as in shock absorbers, brakes, door checks, low pressure hydraulic equipment, and other devices requiring the use of seals against liquids or soft plastic materials.

It will therefore be obvious that I have produced a new and useful oil or grease seal which is simple and inexpensive to manufacture, and which can easily be repaired to replace a damaged washer, or cleaned, without the necessity for unspinning the surrounding ring and respinning it to reassemble the seal after replacement of the washer, and without the use of any tools.

As many apparently widely different embodiments of this invention may be made without departing from the spirit thereof, it is understood that I do not limit myself to the foregoing embodiments or description except as indicated in the following claims.

I claim:

1. An oil seal, comprising a deformable washer, a housing therefor, a resilient member for forcing the washer inwardly, and a multi-segment retaining member removably positioned about the housing to retain the parts in assembled position merely by frictional contact, each segment being of U-shaped cross-section and sufficiently resilient to permit it to be removably sprung into position to engage the parts of the housing and retain them in assembled position until it is desired to disassemble them.

2. An oil seal, comprising a retaining shell, having a garter spring, a supporting ring, a deformable washer, and a clamping ring disposed therein, and means for retaining said parts in assembled relation merely by frictional contact, comprising a plurality of resilient retaining segments positioned about said retaining shell and adapted for easy disassembling without deforming said retaining means.

3. An oil seal, comprising a retaining shell, a garter spring disposed therein, a supporting ring resting on the garter spring, a washer arranged inside of the garter spring and extending over the supporting ring, a clamping ring for holding the washer in position and completing the enclosure, and a pair of tightly fitting U-shaped resilient retaining segments adapted to slip over the assembled parts and retain them in position merely by frictional contact through the resiliency of the segments.

4. An oil seal, comprising, in combination, an L-shaped retaining shell, a coiled spring of somewhat less diameter than the retaining shell disposed therein, an arcuate-shaped supporting ring received in the angle of the L-shaped retaining shell and forming a housing for the coiled spring, a flexible washer of arcuate shape arranged inside of the coiled spring and extending over the supporting ring into contact with one side of the L-shaped retaining shell, a substantially flat clamping ring placed over the washer to hold it in position and arranged inside of the L-shaped retaining shell to complete the enclosure, and a pair of tightly fitting U-shaped resilient retaining segments adapted to slip over the L-shaped retaining shell and the clamping ring and retain all of the assembled parts in position merely by frictional contact through the resiliency of the segments.

WILLIAM I. TAWES.

REFERENCES CITED

The following references are of record in the file of this patent:

UNITED STATES PATENTS

| Number | Name | Date |
|---|---|---|
| Re. 22,337 | Johnson et al. | June 22, 1943 |
| 1,300,294 | Pribil | Apr. 15, 1919 |
| 2,000,349 | Olsen | May 7, 1935 |
| 2,055,917 | Victor et al. | Sept. 29, 1936 |